US012781044B2

(12) United States Patent
Misawa et al.

(10) Patent No.: US 12,781,044 B2
(45) Date of Patent: Nov. 3, 2026

(54) RESIN COMPOSITION, MOLDED ARTICLE AND METHOD FOR PRODUCING RESIN COMPOSITION

(71) Applicant: Mitsubishi Chemical Corporation, Tokyo (JP)

(72) Inventors: Hiroto Misawa, Tokyo (JP); Yuya Kanamori, Tokyo (JP); Norihito Sakai, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 591 days.

(21) Appl. No.: 17/210,716

(22) Filed: Mar. 24, 2021

(65) Prior Publication Data

US 2021/0206965 A1 Jul. 8, 2021

Related U.S. Application Data

(63) Continuation of application No. PCT/JP2019/038424, filed on Sep. 27, 2019.

(30) Foreign Application Priority Data

Sep. 28, 2018 (JP) ................................ 2018-183126

(51) Int. Cl.

| | |
|---|---|
| ***C08L 67/04*** | (2006.01) |
| ***B32B 27/30*** | (2006.01) |
| ***B32B 27/36*** | (2006.01) |
| ***C08G 63/91*** | (2006.01) |
| ***C08J 3/12*** | (2006.01) |
| ***C08J 11/04*** | (2006.01) |
| ***C08L 29/04*** | (2006.01) |

(52) U.S. Cl.

CPC .............. *C08L 67/04* (2013.01); *B32B 27/30* (2013.01); *B32B 27/36* (2013.01); *C08G 63/916* (2013.01); *C08J 3/12* (2013.01); *C08J 11/04* (2013.01); *C08L 29/04* (2013.01)

(58) Field of Classification Search

CPC ......... C09L 67/04; B32B 27/30; B32B 27/36; C08G 3/916; C08G 63/916; C08G 63/183; C08G 63/52; C08J 3/12; C08J 11/04; C08L 29/04; C08L 67/04; C08L 67/06

See application file for complete search history.

(56) References Cited

U.S. PATENT DOCUMENTS

| | | | | |
|---|---|---|---|---|
| 9,085,660 B2 * | 7/2015 | Quintana | ................. | A24D 3/08 |
| 2009/0054572 A1 | 2/2009 | Kamikawa et al. | | |
| 2009/0312493 A1 * | 12/2009 | Huang | .................... | C08L 67/04 525/58 |
| 2011/0065573 A1 * | 3/2011 | McEneany | ............. | D01F 6/625 524/502 |
| 2014/0080968 A1 | 3/2014 | Quintana et al. | | |
| 2014/0308534 A1 * | 10/2014 | Inoue | ......................... | C09J 4/06 428/483 |
| 2018/0304573 A1 | 10/2018 | Tokunaga et al. | | |

FOREIGN PATENT DOCUMENTS

| | | |
|---|---|---|
| CN | 103146165 | 6/2013 |
| JP | 2007-211129 | 8/2007 |
| JP | 2014-051620 | 3/2014 |
| JP | 2016-204550 A | 12/2016 |
| WO | 2010/055903 | 5/2010 |
| WO | 2013/069726 | 5/2013 |
| WO | 2017/069127 | 4/2017 |

OTHER PUBLICATIONS

Extended European Search Report issued in EP Patent Application No. 19865248.9, Oct. 12, 2021.

Office Action issued in European Patent Application No. 19865248.9, Jul. 17, 2023.

ISR issued in WIPO Patent Application No. PCT/JP2019/038424, Oct. 29, 2019, English translation.

Written Opinion issued in WIPO Patent Application No. PCT/JP2019/038424, Oct. 29, 2019, English translation.

IPRP issued in WIPO Patent Application No. PCT/JP2019/038424, Mar. 23, 2021, English translation.

Office Action issued in EP Patent Application No. 19865248.9, Jun. 3, 2025.

* cited by examiner

*Primary Examiner* — Alicia Bland

(74) *Attorney, Agent, or Firm* — GREENBLUM & BERNSTEIN, P.L.C.

(57) ABSTRACT

A resin composition is provided which is capable of melt molding multiple times and thus has excellent recyclability. The resin composition contains a polylactic acid (A), an acid-modified aliphatic polyester-based resin (B) and a polyvinyl alcohol-based resin (C), in which a content of the acid-modified aliphatic polyester-based resin (B) is 0.3 to 15 parts by weight with respect to 100 parts by weight of the polylactic acid (A) and a content of the polyvinyl alcohol-based resin (C) is 0.3 to 10 parts by weight with respect to 100 parts by weight.

16 Claims, No Drawings

RESIN COMPOSITION, MOLDED ARTICLE AND METHOD FOR PRODUCING RESIN COMPOSITION

CLAIM FOR PRIORITY

This application is a Continuation of PCT/JP2019/038424 filed Sep. 27, 2019, and claims the priority benefit of Japanese application 2018-183126 filed Sep. 28, 2018, the contents of which are expressly incorporated by reference herein in their entireties.

TECHNICAL FIELD

The present invention relates to a resin composition containing a polylactic acid, an acid-modified aliphatic polyester-based resin, and a polyvinyl alcohol-based resin.

BACKGROUND ART

Conventionally, there have been made attempts to recycle scraps, for example, refuse, unnecessary portions such as end portions and defective products generated during the production of molded articles using a thermoplastic resin, or wastes after using the molded articles in various uses.

In order to recover the molded articles after they have been used in various uses, it is necessary to enhance the motivation of general consumers, and efforts are being made to raise the recovery rate, but it is presumed that it is extremely difficult to reach a recovery rate of 100%.

Moreover, the molded articles that could not be recovered become microplastics, which flow into the sea and cause an environmental problem.

Therefore, biodegradable resins that are decomposed by microorganisms in the natural environment have been attracting attention. The biodegradable resins are suitable for environmental protection because they are decomposed in soil or water even if they are not recovered.

A typical example of such a biodegradable resin is polylactic acid. Polylactic acid is decomposed in the natural environment, but it is still insufficient in terms of recycling (melt molding many times).

Specifically, when it is intended that an end portion or the like generated during the production of a molded article using a resin containing polylactic acid is to put into an extruder again and melt-molded to manufacture a molded article again, there is a problem that the crystallinity of polylactic acid becomes high and thus melt molding becomes difficult.

Accordingly, in order to solve such a problem, it has been proposed to incorporate a specific acrylic resin into polylactic acid (see, for example, PTL 1).

CITATION LIST

Patent Literature

PTL 1: JP-A-2014-51620

SUMMARY OF INVENTION

Technical Problem

However, it is a problem that the resin composition described in PTL 1 does not have biodegradability.

Accordingly, an object of the present invention is to provide a resin composition which is capable of affording a biodegradable molded article and which can be melt-molded multiple times, has excellent recyclability, and has an excellent film forming property.

Solution to Problem

The present inventors have found that a resin composition that is excellent in recyclability and the film formation property is obtained by incorporating an acid-modified aliphatic polyester-based resin and a polyvinyl alcohol-based resin into polylactic acid so as to have specific contents, respectively. Thus, they have accomplished the present invention.

That is, the present invention includes any of the following configurations (1) to (5).

(1) A resin composition containing a polylactic acid (A), an acid-modified aliphatic polyester-based resin (B), and a polyvinyl alcohol-based resin (C), wherein a content of the acid-modified aliphatic polyester-based resin (B) is 0.3 to 15 parts by weight with respect to 100 parts by weight of the polylactic acid (A), and a content of the polyvinyl alcohol-based resin (C) is 0.3 to 10 parts by weight with respect to 100 parts by weight of the polylactic acid (A).

(2) The resin composition according to the above (1), wherein the acid-modified aliphatic polyester-based resin (B) is an aliphatic polyester-based resin modified with α,β-unsaturated carboxylic acids.

(3) The resin composition according to the above (1) or (2), wherein the polylactic acid (A) is a polylactic acid (A1) that is not acid-modified.

(4) A molded article containing the resin composition according to any one of the above (1) to (3).

(5) A method for producing the resin composition according to any one of the above (1) to (3), which comprises pulverizing and melting a laminate containing a polylactic acid (A) layer, an acid-modified aliphatic polyester-based resin (B) layer, and a polyvinyl alcohol-based resin (C) layer.

Advantageous Effects of Invention

It is presumed that in the resin composition of the present invention, recyclability has improved by controlling the crystallization rate and crystallinity of polylactic acid. Incidentally, when melt molding can be done multiple times and a film produced from pellets (recycled pellets) obtained by performing melt molding multiple times has a smaller difference in mechanical properties from a film made of polylactic acid, the recyclability can be said high.

The resin composition of the present invention is excellent in recyclability because the refuse and end portions generated during the production of a molded article and the molded article after use can be melt-molded many times. Accordingly, the resin composition of the present invention is useful for uses such as cup molding and inflation film molding.

DESCRIPTION OF EMBODIMENTS

Hereinafter, the present invention will be described in detail, but these are examples of desirable embodiments.

In the present specification, (meth)allyl indicates allyl or methallyl, (meth)acrylic indicates acrylic or methacrylic, and (meth)acrylate indicates acrylate or methacrylate. Further, in the present invention, the numerical values sandwiching the word "to" is included in the range specified by "to". For example, "10 to 30" represents a range of 10 or more and 30 or less.

The resin composition of the present invention contains a polylactic acid (A), an acid-modified aliphatic polyester-based resin (B) and a polyvinyl alcohol-based resin (hereinafter, also referred to as PVA-based resin) (C), wherein a content of the acid-modified aliphatic polyester-based resin (B) is 0.3 to 15 parts by weight with respect to 100 parts by weight of the polylactic acid (A), and a content of the polyvinyl alcohol-based resin (C) is 0.3 to 10 parts by weight with respect to 100 parts by weight of the polylactic acid (A).

Hereinafter, each component will be described.

[Polylactic Acid (A)]

Polylactic acid is an aliphatic polyester-based resin containing a lactic acid structural unit as a main component, and is a polymer using L-lactic acid, D-lactic acid, or a cyclic dimer thereof, i.e., L-lactide, D-lactide, or DL-Lactide as a raw material.

The polylactic acid to be used in the present invention is preferably a homopolymer of these lactic acids, but it may contain a copolymerization component other than lactic acids when the amount is an amount where the characteristics are not impaired, for example, 10 mol % or less.

Examples of such a copolymerization component include aliphatic hydroxycarboxylic acids, aliphatic dicarboxylic acids, and aliphatic diol compounds.

Examples of the aliphatic hydroxycarboxylic acid include glycolic acid, malic acid, tartaric acid, and citric acid. Examples of the aliphatic dicarboxylic acid include succinic acid, glutaric acid, adipic acid, 1,5-pentanedicarboxylic acid, and 1,6-hexanedicarboxylic acid. Examples of the aliphatic diol compound include ethylene glycol, propylene glycol, 1,4-butanediol, 1,5-pentanediol, and 1,6-hexanediol.

The content ratio (L/D) of the L-lactic acid component and the D-lactic acid component in the polylactic acid is usually 95/5 or more, and one having a ratio of particularly 99/1 or more, especially 99.8/0.2 or more is preferably used. The higher the content of the L-lactic acid component is, the higher the melting point is, and the heat resistance is improved. Conversely, the smaller the content is, the lower the melting point is, and the heat resistance tends to be insufficient. Specifically, in the case of a homopolymer of polylactic acid, the melting point of the homopolymer having an L/D of 95/5 is 152° C. or higher, and the melting point in case of 99/1 is 171° C. or higher, and that in case of 99.8/0.2 is 175° C. or higher.

The MFR (melt flow rate) of the polylactic acid to be used in the present invention (210° C., 2.16 kg, measured according to ASTM D1238) is usually 0.1 to 100 g/10 min, preferably 1 to 30 g/10 min. When the MFR is excessively large, the melt viscosity during thermal melt molding tends to be excessively high, which tends to make good film formation difficult. Conversely, when the MFR is excessively small, the mechanical strength of the obtained laminate tends to be insufficient.

The polylactic acid (A) to be used in the present invention is preferably a polylactic acid (A1) that is not acid-modified.

Examples of commercially available products of such polylactic acid-based resins include "Ingeo" series manufactured by NatureWorks, "Lacea" manufactured by Mitsui Chemicals, Inc., "REVODE" manufactured by Zhejiang Hisun Biomaterials Co., Ltd., and "Vyloecol" manufactured by Toyobo Co., Ltd. "(all are trade names).

[Acid-Modified Aliphatic Polyester-Based Resin (B)]

It is preferable that the acid-modified aliphatic polyester-based resin (B) to be used in the present invention has any one or more structural units of the following general formulae (1) to (3) and are biodegradable.

[Chem. 1]

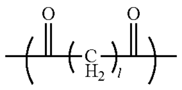

(1)

[In the formula (1), 1 is an integer of 2 to 6.]

[Chem. 2]

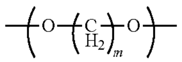

(2)

[In the formula (2), m is an integer of 2 to 6.]

[Chem. 3]

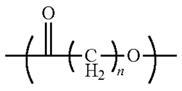

(3)

[In the formula (3), n is an integer of 2 to 6.]

The biodegradability in the present invention is according to ISO 17088.

In view of easy biodegradability, the total amount of the acid-modified aliphatic polyester-based resin (B) is desirably composed of any one or more of these formulae (1) to (3). However, it may have other structural units for the purpose of control of heat resistance, strength, and biodegradability, and the like. The total amount of the structural units represented by the general formulae (1) to (3) is preferably 50 mol % or more, more preferably 70 mol % or more, and still more preferably 90 mol % or more.

The acid-modified aliphatic polyester-based resin (B) having at least one structural unit selected from the structural units represented by the general formulae (1) to (3) is obtained by polycondensation of an aliphatic dicarboxylic acid and/or an aliphatic diol compound and further acid modification.

Examples of such an aliphatic dicarboxylic acid include succinic acid, glutaric acid, adipic acid, 1,5-pentanedicarboxylic acid, and 1,6-hexanedicarboxylic acid, and in particular, from the viewpoints of moldability and flexibility, adipic acid is preferable.

Examples of the aliphatic diol compound include ethylene glycol, propylene glycol, 1,4-butanediol, 1,5-pentanediol, and 1,6-hexanediol, and in particular, from the viewpoints of moldability and flexibility, 1,4-butanediol is preferable.

Further, as other components, specifically, there may be mentioned, for example, hydroxy acids such as 4-hydroxybutyric acid, 5-hydroxyvaleric acid, and 6-hydroxyhexanoic acid; those derived from aromatic dicarboxylic acids such as terephthalic acid and isophthalic acid; those derived from dicarboxylic acids in which the number of alkylene chains is less than two, such as oxalic acid and malonic acid; those derived from hydroxycarboxylic acids in which the number of alkylene chains is less than two, such as glycolic acid and lactic acid; other ones known as copolymerization components for polyester-based resins.

The weight average molecular weight of the acid-modified aliphatic polyester-based resin (B) is usually 5000 to 50000, preferably 5500 to 40000, and particularly preferably 6000 to 30000. When the weight average molecular weight is excessively large, the melt viscosity tends to be high and melt molding tends to be difficult, and conversely, when the weight average molecular weight is excessively small, the molded article tends to be brittle.

The acid value of the acid-modified aliphatic polyester-based resin (B) is preferably 2.0 to 6.5 mg·KOH/g, more preferably 2.5 to 6.0 mg·KOH/g, particularly preferably, 3.0 to 5.5 mg·KOH/g, and more preferably 3.5 to 5.0 mg·KOH/g.

When the acid value is excessively high, the appearance becomes poor, and when the acid value is excessively low, the adhesiveness with other resins tends to decrease. Thus, when the acid value is excessively high or excessively low, the advantageous effect of the present invention cannot be obtained.

A method for measuring the acid value described above will be described in detail below.

First, the acid-modified aliphatic polyester-based resin (B) to be measured is well washed with a solvent. Such cleaning is performed for washing away impurities in the acid-modified aliphatic polyester-based resin, mainly an unreacted α,β-unsaturated carboxylic acid or an anhydride thereof. As such a solvent, it is necessary to use a solvent in which the acid-modified aliphatic polyester-based resin (B) does not dissolve, and examples thereof include water, acetone, methanol, ethanol, and isopropanol.

Next, 100 ml of tetrahydrofuran is taken as a solvent in a test vial, and 5 g of the biodegradable acid-modified polyester-based resin (B) is added thereto while stirring with a hot stirrer (set temperature: 75° C., stirrer rotation speed: 750 rpm). Stirring is continued for 5 to 6 hours until the acid-modified aliphatic polyester-based resin (B) is dissolved. After dissolution, 4 ml of ultrapure water is added and stirring is continued for another 10 minutes to prepare a test solution. The test solution is titrated with an aqueous potassium hydroxide solution (N/10) using an automatic titration device, and an acid value is determined according to the following equation.

$$\text{Acid value AV (mg·KOH/g)}=((A-B)\times f\times 5.61)/S \qquad \text{(Equation)}$$

A=Amount of aqueous potassium hydroxide solution N/10 required for acid-modified aliphatic polyester-based resin (B) (ml)

B=Amount of aqueous potassium hydroxide solution N/10 required for blank test (ml)

f=Titer of N/10 aqueous potassium hydroxide solution

S=Amount of acid-modified aliphatic polyester-based resin (B) collected (g)

Titration Device

Titration measurement device: Potential difference automatic titration device AT-610 manufactured by Kyoto Electronics Manufacturing Co., Ltd.

Reference electrode: Composite glass electrode C-171

Titration solution: Kishida Chemical Co., Ltd., aqueous potassium hydroxide solution (N/10)

Examples of the above-mentioned acid value control include the following methods.

(i) A method of adjusting the amount of a radical initiator at the time of graft-polymerizing an α,β-unsaturated carboxylic acid or an anhydride thereof with the acid-modified aliphatic polyester-based resin.

(ii) A method of drying the acid-modified aliphatic polyester-based resin to reduce the water absorption rate.

Of these, the method (i) is preferable because it is easy to control the acid value.

The acid-modified aliphatic polyester-based resin (B) is preferably an acid-modified aliphatic polyester-based resin (B) having a polar group obtained by graft-polymerizing an α,β-unsaturated carboxylic acid or an anhydride thereof (hereinafter, an α,β-unsaturated carboxylic acid or an anhydride thereof is sometimes referred to as α,β-unsaturated carboxylic acids) with a raw material aliphatic polyester-based resin (B'), the resin (B) being satisfactory in view of adhesiveness.

Specific examples of the α,β-unsaturated carboxylic acids to be used for introducing the polar group into the raw material aliphatic polyester-based resin (B') by graft polymerization include α,β-unsaturated monocarboxylic acids such as acrylic acid and methacrylic acid; α,β-unsaturated dicarboxylic acid such as maleic acid, fumaric acid, itaconic acid, citrus acid, tetrahydrophthalic acid, crotonic acid, and isocrotonic acid, or anhydrides thereof, and preferably an anhydride of an α,β-unsaturated dicarboxylic acid is used.

It should be noted that these α,β-unsaturated carboxylic acids are not limited to the case where one type is used alone, and two or more types may be used in combination.

The method for graft-polymerizing α,β-unsaturated carboxylic acids with the raw material aliphatic polyester-based resin (B') is not particularly limited, and a known method can be used. A thermal reaction alone is possible but, in order to increase the reactivity, it is preferable to use a radical initiator. Further, as a method for reaction, a solution reaction, a reaction as a suspension, a reaction in a molten state without using a solvent or the like (melting method), or the like can be mentioned, but particularly, the reaction is preferably carried out by the melting method.

As commercially available products of the raw material aliphatic polyester-based resin (B'), for example, there may be mentioned “Ecoflex” manufactured by BASF Co., Ltd. as an aliphatic polyester-based resin containing a polycondensation product of adipic acid/terephthalic acid/1,4-butanediol as a main component, “Bio PBS” manufactured by Mitsubishi Chemical Corporation as an aliphatic polyester-based resin containing a polycondensation product of succinic acid/1,4-butanediol/lactic acid as a main component (both are trade names), and the like.

Hereinafter, the melting method will be described in detail. As melting methods, there can be, for example, used a method in which the raw material aliphatic polyester-based resin (B'), α,β-unsaturated carboxylic acids, and a radical initiator are mixed in advance and then melt-kneaded in a kneader to react them, or a method of blending α,β-unsaturated carboxylic acids and a radical initiator with a biodegradable polyester-based resin in a molten state in a kneader.

As a mixer to be used at the time of mixing the raw materials in advance, for example, a Henschel mixer, a ribbon blender, and the like are used, and as a kneader to be used for melt kneading, for example, a single screw or twin screw extruder, a roll, a Banbury mixer, a kneader, a Brabender mixer, and the like can be used.

The temperature during the melt kneading may be appropriately set within a temperature range that is equal to or higher than the melting point of the raw material aliphatic polyester-based resin (B') and thermal deterioration does not occur. Melt mixing is performed at preferably 100 to 250° C., more preferably 160 to 220° C.

The amount of the α,β-unsaturated carboxylic acids to be used is usually 0.0001 to 5 parts by weight, particularly 0.001 to 1 part by weight, with respect to 100 parts by weight of the raw material aliphatic polyester-based resin (B'). In particular, the range of 0.02 to 0.45 parts by weight is preferably used. When the blending amount is excessively small, a sufficient amount of the polar group will not be introduced into the raw material aliphatic polyester-based resin (B'), and the interlayer adhesiveness, particularly the adhesive force with the PVA-based resin layer tends to be insufficient. Further, when the blending amount is excessively large, the α,β-unsaturated carboxylic acids that has not been graft-polymerized may remain in the resin, which tends to cause poor appearance.

The radical initiator is not particularly limited, and known ones can be used. Examples thereof include organic and inorganic peroxides such as t-butyl hydroperoxide, cumene hydroperoxide, 2,5-dimethylhexane-2,5-dihydroperoxide, 2,5-dimethyl-2,5-bis(t-butyloxy)hexane, 3,5,5-trimethylhexanoyl peroxide, t-butyl peroxybenzoate, benzoyl peroxide, m-toluoyl peroxide, dicumyl peroxide, 1,3-bis(t-butylperoxyisopropyl)benzene, dibutyl peroxide, methyl ethyl ketone peroxide, potassium peroxide, and hydrogen peroxide; azo compounds such as 2,2'-azobisisobutyronitrile, 2,2'-azobis(isobutylamide) dihalide, 2,2'-azobis[2-methyl-N-(2-hydroxyethyl)propionamide], and azodi-t-butane; and carbon radical generators such as dicumyl.

One of these may be used alone, or two or more thereof may be used in combination.

The blending amount of the radical initiator is usually 0.00001 to 0.5 parts by weight with respect to 100 parts by weight of the raw material aliphatic polyester-based resin (B'). In particular, the range of particularly 0.0001 to 0.1 parts by weight, especially 0.002 to 0.05 parts by weight is preferably used.

When the blending amount of the radical initiator is excessively small, graft polymerization may not sufficiently occur and the advantageous effect of the present invention may not be obtained. When the amount is excessively large, the molecular weight may be lowered by the decomposition of the aliphatic polyester-based resin, and the adhesive strength tends to be insufficient due to insufficient cohesive force.

[Polyvinyl Alcohol-Based Resin (C)]

The polyvinyl alcohol (PVA)-based resin (C) to be used in the present invention is a resin mainly composed of a vinyl alcohol structural unit, which is obtained by saponifying a polyvinyl ester-based polymer obtained by polymerizing a vinyl ester-based monomer. The resin is composed of a vinyl alcohol structural unit equivalent to the degree of saponification and a vinyl ester structural unit remaining without saponification.

Examples of the vinyl ester-based monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate, but vinyl acetate is preferably used from the economical viewpoint.

The average polymerization degree of the PVA-based resin (C) to be used in the present invention (measured according to JIS K6726) is preferably 200 to 1800, particularly 300 to 1500, and especially 300 to 1000.

When the average polymerization degree is excessively small, the mechanical strength of the PVA-based resin (C) tends to be insufficient, and conversely, when the average polymerization degree is excessively large, the fluidity will decrease in the case of thermal melt molding and the moldability tends to decrease. Also, the heat generated by shearing during the molding may occur abnormally, and the PVA-based resin may be easily thermally decomposed.

The degree of saponification of the PVA-based resin (C) to be used in the present invention (measured according to JIS K6726) is preferably 70 to 100 mol %, particularly 90 to 99.9 mol %, and particularly 98 to 99.8 mol %.

When the degree of saponification is excessively low, the resin tends to be easily thermally decomposed during melt molding.

Further, in the present invention, as the PVA-based resin (C), there can be used those obtained by copolymerizing various monomers at the time of producing the polyvinyl ester-based resin and saponifying the resultant, and various modified PVA-based resins obtained by introducing various functional groups into unmodified PVA by post modification.

Examples of the monomers to be used for copolymerization with a vinyl ester-based monomer include olefins such as ethylene, propylene, isobutylene, α-octene, α-dodecene, and α-octadecene, hydroxyl group-containing α-olefins such as 3-butene-1-ol, 4-pentene-1-ol, 5-hexene-1-ol, and 3,4-dihydroxy-1-butene and derivatives such as acylated ones thereof, unsaturated acids such as acrylic acid, methacrylic acid, crotonic acid, maleic acid, maleic anhydride and itaconic acid, salts, monoesters, or dialkyl esters thereof, nitriles such as acrylonitrile and methacrylonitrile, amides such as diacetoneacrylamide, acrylamide, and methacrylamide, olefin sulfonic acids such as ethylenesulfonic acid, allylsulfonic acid, methallylsulfonic acid or salts thereof, vinyl compounds such as alkyl vinyl ethers, dimethylallyl vinyl ketone, N-vinylpyrrolidone, vinyl chloride, vinylethylene carbonate, 2,2-dialkyl-4-vinyl-1,3-dioxolane, glycerin monoallyl ether, and 3,4-diacetoxy-1-butene, substituted vinyl acetates such as isopropenyl acetate and 1-methoxyvinyl acetate, vinylidene chloride, 1,4-diacetoxy-2-butene, and vinylene carbonate.

Examples of the PVA-based resin into which a functional group has been introduced by a post-reaction include a resin having an acetoacetyl group introduced by a reaction with a diketene, a resin having a polyalkylene oxide group introduced by a reaction with ethylene oxide, a resin having a hydroxyalkyl group introduced by a reaction with an epoxy compound or the like, or a resin obtained by reacting an aldehyde compound having any of a variety of functional groups with PVA.

The content of modified species in the modified PVA-based resin, that is, a structural unit derived from various monomers in the copolymer or a functional group introduced by the post-reaction cannot be said unconditionally because the characteristics vary greatly depending on the modified species, and is preferably in the range of 1 to 20 mol %, and the range of 2 to 10 mol % is particularly preferable.

Among these various modified PVA-based resins, in the present invention, the PVA-based resin having a structural unit having a 1,2-diol structure in the side chain represented by the following general formula (4) is preferably used in view of facilitating melt molding.

[Chem. 4]

(4)

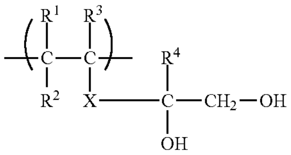

[In the formula (4), $R^1$ to $R^4$ each independently represent a hydrogen atom or an alkyl group having 1 to 4 carbon atoms, and X represents a single bond or a bond chain.]

$R^1$ to $R^4$ in the structural unit represented by the general formula (4) each independently represent a hydrogen atom or an alkyl group having 1 to 4 carbon atoms. $R^1$ to $R^4$ are preferably all hydrogen atoms, however may be an alkyl group having 1 to 4 carbon atoms as long as the resin properties are not significantly impaired. Examples of the alkyl group include a methyl group, an ethyl group, an n-propyl group, an isopropyl group, an n-butyl group, an isobutyl group, and a tert-butyl group, and the alkyl group may have a functional group such as a halogen group, a hydroxyl group, an ester group, a carboxylic acid group, or a sulfonic acid group, if necessary.

Further, X in the 1,2-diol structural unit represented by the general formula (4) is most preferably a single bond in view of thermal stability and stability under high temperature or under acidic conditions. However, it may be a bond chain as long as it does not inhibit the advantageous effect of the present invention. Examples of such a bond chain include hydrocarbon groups such as an alkylene group, an alkenylene group, an alkynylene group, a phenylene group, and a naphthylene group (these hydrocarbon groups may be substituted with a halogen atom such as a fluorine atom, a chlorine atom, or a bromine atom), and also $-O-$, $-(CH_2O)_m-$, $-(OCH_2)_m-$, $-(CH_2O)_mCH_2-$, $-CO-$, $-COCO-$, $-CO(CH_2)_mCO-$, $-CO(C_6H_4)CO-$, $-S-$, $-CS-$, $-SO-$, $-SO_2-$, $-NR-$, $-CONR-$, $-NRCO-$, $-CSNR-$, $-NRCS-$, $-NRNR-$, $-HPO_4-$, $-Si(OR)_2-$, $-OSi(OR)_2-$, $-OSi(OR)_2O-$, $-Ti(OR)_2-$, $-OTi(OR)_2-$, $-OTi(OR)_2O-$, $-Al(OR)-$, $-OAl(OR)-$, and $-OAl(OR)O-$. Each R is independently an arbitrary substituent, and is preferably a hydrogen atom or an alkyl group (particularly an alkyl group having 1 to 4 carbon atoms). m is preferably an integer of 1 to 5. Of these, the bond chain is preferably an alkylene group having 6 or less carbon atoms, particularly a methylene group, or $-CH_2OCH_2-$ from the viewpoint of stability during the production or use.

A particularly preferable structure in the 1,2-diol structural unit represented by the general formula (4) is a structural unit represented by the following general formula (5) in which $R^1$ to $R^4$ are all hydrogen atoms and X is a single bond.

[Chem 5]

(5)

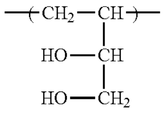

As a method for producing a PVA-based resin having a 1,2-diol structure in a side chain, it can be produced by the method described in paragraphs [0026] to [0034] of JP-A-2015-143356.

The content of the 1,2-diol structural unit contained in the PVA-based resin having a 1,2-diol structure in the side chain is preferably 1 to 20 mol %, more preferably 2 to 10 mol %, and particularly 3 to 8 mol %. When the content is excessively low, the effect of the side chain 1,2-diol structure is difficult to obtain, and when the content is excessively high, the gas barrier property at high humidity tends to be significantly reduced.

The content of the 1,2-diol structural unit in the PVA-based resin can be determined from a $^1$H-NMR spectrum (solvent: DMSO-d6, internal standard: tetramethylsilane) of a completely saponified PVA-based resin. Specifically, the content is calculated from the peak areas derived from a hydroxyl proton, a methine proton, and a methylene proton in the 1,2-diol unit, a methylene proton of the main chain, a proton of the hydroxyl group linked to the main chain, and the like.

Further, the PVA-based resin to be used in the present invention may be one type or a mixture of two or more types. In that case, there can be used combinations of the above-mentioned unmodified PVAs, the unmodified PVA and the PVA-based resins having the structural unit represented by the general formula (4), the PVA-based resins having structural units represented by the general formula (4), which are different in the degree of saponification, the polymerization degree, the degree of modification, and the like, and the PVA-based resin having the structural unit represented by the general formula (4) and another modified PVA-based resin.

[Resin Composition]

The resin composition of the present invention contains a polylactic acid (A), an acid-modified aliphatic polyester-based resin (B), and a PVA-based resin (C).

The content of the acid-modified aliphatic polyester-based resin (B) is 0.3 to 15 parts by weight, preferably 0.3 to 10 parts by weight, more preferably 0.3 to 8 parts by weight, still more preferably 1 to 7 parts by weight, and particularly preferably 3 to 6 parts by weight with respect to 100 parts by weight of the polylactic acid (A). When the content is excessively small, the strength of the formed layer tends to decrease, and when the content is excessively large, the fluidity tends to be unstable during the layer formation.

The content of the PVA-based resin (C) is 0.3 to 10 parts by weight, preferably 0.3 to 8 parts by weight, more preferably 1 to 7 parts by weight, and still more preferably 3 to 6 parts by weight with respect to 100 parts by weight of the polylactic acid (A). When the content is excessively small, the fluidity tends to be unstable during the layer formation, and when the content is excessively large, the adhesiveness with the polylactic acid layer tends to decrease.

Moreover, the resin composition of the present invention contains, if necessary, a reinforcing agent, a filler, a plasticizer, a pigment, a dye, a lubricant, an antioxidant, an antistatic agent, a UV absorber, a heat stabilizer, a light stabilizer, a surfactant, an antibacterial agent, an antistatic agent, a desiccant, an antiblocking agent, a flame retardant, a crosslinking agent, a curing agent, a foaming agent, a crystal nucleating agent, and the like, as long as the advantageous effect of the present invention is not impaired.

The resin composition to be used in the present invention is usually formed into a molded article such as pellets or powders for use as a molding material. Of these, the pellet form is preferable in view of charging into the molding machine, handling, and little problem of generation of fine powder.

A known method can be used for molding into such a pellet form, but efficient is a method of extruding into a strand form from an extruder, cooling, and subsequently cutting to a predetermined length to form a columnar pellet.

As the size of the columnar pellet, the length is usually 1 to 4 mm, preferably 2 to 3 mm, and the diameter is usually 1 to 4 mm, preferably 2 to 3 mm.

As a method for producing the resin composition of the present invention, there may be, for example, mentioned (i) a method of dry-blending the component (A), the component (B) and the component (C), followed by melting and kneading, (ii) a method of dissolving the component (A), the component (B) and the component (C) in a solvent and mixing them in a solution form, (iii) a method of pulverizing a laminate containing a component (A) layer, a component (B) layer and a component (C) layer and melting and kneading the resultant The method (iii) is mainly used at the time when end portions of a laminate or the like is recycled.

As a method of melt-kneading, regarding the above-mentioned production method (i), for example, there may be mentioned (I) a method of mixing the component (A), the component (B) and the component (C) with a mixer such as a Henschel mixer or a ribbon blender and subsequently melting and kneading the resultant with a melt kneader such as a single screw or twin screw extruder, a roll, a Banbury mixer, a kneader, or a Brabender mixer. Regarding the above-mentioned production method (iii), for example, there may be mentioned (II) a method of pulverizing unnecessary portions such as both ends of a multilayer film having layers each containing the component (A), the component (B) or the component (C), and melting and kneading with a melt kneader such as a single screw or twin screw extruder, a roll, a Banbury mixer, a kneader, and a Brabender mixer.

Further, the temperature during the melt kneading can be appropriately set within a temperature range that is equal to or higher than the melting points of the polylactic acid (A), the acid-modified aliphatic polyester-based resin (B), and the PVA-based resin (C) and does not cause thermal deterioration, and the temperature is preferably 100 to 250° C., particularly preferably 150 to 230° C., and even more preferably 180 to 210° C.

The resin composition to be used in the present invention is useful as a molding material because it is excellent in moldability, particularly melt moldability. As the melt molding method, known molding methods such as extrusion molding, inflation molding, injection molding, blow molding, vacuum molding, pressure molding, compression molding, and calendar molding can be used. The molded article of the present invention can be produced by melt molding the resin composition at a melting temperature of 150 to 230° C., preferably 160 to 220° C., particularly preferably 180 to 210° C.

In addition, examples of the molded article of the present invention include those having various shapes such as films, sheets, pipes, disks, rings, bags, bottles, and fibers.

For example, the thickness in the case of using it as a film is usually 5 to 90 μm, preferably 15 to 70 μm.

Examples of use applications of the molded article of the present invention include packaging materials for foods and drinks, coffee capsules, containers for beverages, inner bags for bag-in-boxes, packing for containers, medical infusion bags, containers for organic liquids, pipes for transporting organic liquids, containers for various gases, tubes, and hoses. Moreover, it can also be used for various electric parts, automobile parts, industrial parts, leisure goods, sports goods, daily necessities, toys, medical equipment, and the like.

EXAMPLES

Hereinafter, demonstration will be made by ways of Examples of the present invention, but the present invention is not limited to the description in Examples, unless the gist of the present invention is exceeded.

In the example, "part" and "%" are based on weight.

Example 1

[Preparation of Acid-Modified Aliphatic Polyester-Based Resin (B)]

After 100 parts of an adipic acid/1,4-butanediol polycondensation product as a raw material aliphatic polyester-based resin (B') ("Ecoflex C1200" manufactured by BASF, hereinafter also abbreviated as "PBAT"), 0.35 parts of maleic anhydride, and 0.25 parts of 2,5-dimethyl-2,5-bis(t-butyloxy)hexane ("Perhexa 25B" manufactured by NOF Corporation) as a radical initiator were dry-blended, the resultant was melt-kneaded with a twin screw extruder under the following conditions, extruded into a strand form, cooled with water, and then cut with a pelletizer to obtain cylindrical pellets of an acid-modified aliphatic polyester-based resin (B). The acid value was 4.9 mg·KOH/g.

Conditions for Twin Screw Extruder

- Extruder: Twin screw extruder (KZW15-45/60MG manufactured by Technovel Corporation)
- Screw diameter (D): 15 mm
- Screw length/screw diameter (L/D): 60
- Screw rotation speed: 200 rpm
- Screen mesh: 90/90 mesh
- Processing temperature: 210° C.

[Preparation of PVA-Based Resin (C)]

Into a reaction vessel equipped with a reflux condenser, a dropping funnel, and a stirrer, 68.0 parts of vinyl acetate, 23.8 parts of methanol, and 8.2 parts of 3,4-diacetoxy-1-butene were charged, 0.3 mol % (with respect to charged vinyl acetate) of azobisisobutyronitrile was added thereto, and the temperature was raised under a nitrogen stream with stirring to initiate polymerization. At the time when the polymerization degree of vinyl acetate reached 90%, m-dinitrobenzene was added to terminate the polymerization, and subsequently the unreacted vinyl acetate monomer was removed from the system by a method of blowing a methanol vapor, whereby a methanol solution of a copolymer was obtained.

Then, the above methanol solution was further diluted with methanol, adjusted to have a concentration of 45% and charged into a kneader. The solution temperature was maintained at 35° C., and a 2% methanol solution of sodium hydroxide was added thereto in an amount of 10.5 mmol with respect to 1 mol (total amount) of vinyl acetate structural units and 3,4-diacetoxy-1-butene structural units in the copolymer, thereby performing saponification. As the saponification proceeded, a saponified product precipitated and became particulate. It was filtered, well washed with methanol and dried in a hot air dryer to prepare a PVA-based resin (C) having a 1,2-diol structural unit represented by the general formula (5) at the side chain.

The degree of saponification of the obtained PVA-based resin (C) was found to be 99.2 mol % when analyzed by alkali consumption required for hydrolysis of the residual vinyl acetate and 3,4-diacetoxy-1-butene.

The average polymerization degree of the PVA-based resin (C) was found to be 450 when analyzed according to JIS K 6726.

The content of the 1,2-diol structural unit represented by the general formula (5) was found to be 6 mol % when calculated based on an integrated value measured by $^1$H-NMR (300 MHz proton NMR, a d6-DMSO solution, internal standard substance; tetramethylsilane, 50° C.).

[Preparation of Resin Composition]

A polylactic acid (A1) that had not been acid-modified ("Ingeo2500HP" manufactured by NatureWorks, MFR 8 g/10 min), the acid-modified aliphatic polyester-based resin (B) obtained above, and the PVA-based resin (C) obtained above were dry-blended so as to have the content of each component as shown in Table 1. Then, the resultant was melt-kneaded with a single screw extruder under the following conditions, extruded into a strand form, and cut with a pelletizer to obtain a resin composition (pellets) of the present invention.

(Pelletization Conditions)

Extruder: A 40 mm single screw extruder ("EF-014" manufactured by Gunze Sangyo, Inc.)

Screw design: Full flight

CR value: 3.4

Strand die: 3.5 mm φ×3 holes

Screw rotation speed: 40 rpm

Screen mesh: 90/90 mesh

Processing temperature: C1/C2/C3/C4/H/D=170/190/210/210/210/210° C.

<Evaluation of Recyclability>

The resin composition (pellets) of the present invention obtained above was charged into a single screw extruder again, and pelletization was performed again under the above pelletization conditions. Pelletization was performed once more under the same conditions, and the presence of molding failure was evaluated. Molding failure is a state in which the pellets do not bite into the extruder and the resin is not stably extruded. The results are shown in Table 1.

[Preparation of Recycled Film]

The resin composition obtained above, which had been pelletized three times, was charged into a single screw extruder again to form a film under the following conditions.

(Film-Forming Conditions at Single Screw Extrusion)

Extruding apparatus: 40 mm single screw extruder ("306-EF027" manufactured by Gunze Sangyo Corporation)

Screw design: Full flight CR value=3.4

Screen mesh: 90/90 mesh

Film-forming die: Hanger coat-type T die (width: 450 mm)

Processing temperature: C1/C2/C3/C4/H/AD//Die=170/190/210/210/210/210/210° C.

Rotation speed: 40 rpm

Pick-up roll: 3 m/min

Cooling temperature: 60° C.

Evaluation film thickness: 100 μm

<Evaluation of Mechanical Properties of Recycled Film>

The elastic modulus of the recycled film obtained above was measured under the following conditions. Further, the difference (%) from the elastic modulus of a PLA monolayer film prepared using only polylactic acid (PLA, "Ingeo2500HP" manufactured by NatureWorks, MFR 8 g/10 min) was calculated according to the following calculation formula, and determined by rounding off to the first decimal place. The results are shown in Table 1.

Test apparatus: AGS-X (manufactured by Shimadzu Corporation)

Test piece: 15 mm in width, 100 μm in thickness

Tensile speed: 50 mm/min

Test atmosphere: 23° C., 50% RH

Calculation formula: (Elastic modulus of recycled film/Elastic modulus of PLA monolayer film×100-100(%)

<Evaluation of Fluidity of Recycled Film>

The film thickness near the center of the recycled film was measured at 10 points at intervals of 30 cm in a flow direction, and the difference between the maximum thickness and the minimum thickness was measured with an electronic caliper ("Digital Micrometer M-30" manufactured Sony Corporation). The results are shown in Table 1

Examples 2 to 5, Comparative Examples 1 to 4

Resin compositions were prepared in the same manner as in Example 1 except that the type of the PVA-based resin and the content of each component of the resin composition are as shown in Table 1 or Table 2. Then, the recyclability, the mechanical properties of the recycled films, and the fluidity of the recycled films were evaluated. The results are shown in Tables 1 and 2.

The PVA-based resin (C) used in Example 4 is a PVA-based resin having a degree of saponification of 88 mol %, an average polymerization degree of 450, and containing 6 mol % of 1,2-diol structural units in the side chain, which was obtained by reducing the amount of sodium hydroxide at the time of saponification and shortening the saponification reaction time in the preparation of the PVA-based resin (C) of Example 1.

Further, the PVA-based resin (C) used in Example 5 is an unmodified PVA having a degree of saponification of 88 mol %, an average polymerization degree of 500, which was obtained by producing polyvinyl acetate without mixing with 3,4-diacetoxy-1-butene during the polymerization of vinyl acetate and saponifying the resultant in the preparation of the PVA-based resin (C) of Example 4.

TABLE 1

| | Polylactic acid (A) | Acid-modified aliphatic polyester (B) | | PVA-based resin (C) | | | | Recycl-ability molding | Evaluation of mechanical properties | | Evaluation of fluidity of recycled film difference in |
|---|---|---|---|---|---|---|---|---|---|---|---|
| | (part) | (part) | base resin | (part) | modification | degree of saponi-fication | average polymerization degree | failure | elastic modulus [MPa] | difference from PLA monolayer film [%] | thickness (μm) |
| Example 1 | 100 | 0.5 | PBAT | 0.5 | 1,2-diol 6 mol % | 99.2 | 450 | absent | 1994 | 3.4 | 3 |

TABLE 1-continued

| | Polylactic acid (A) | Acid-modified aliphatic polyester (B) | | PVA-based resin (C) | | | | Recyclability | Evaluation of mechanical properties | | Evaluation of fluidity of recycled film |
|---|---|---|---|---|---|---|---|---|---|---|---|
| | (part) | (part) | base resin | (part) | modification | degree of saponification | average polymerization degree | molding failure | elastic modulus [MPa] | difference from PLA monolayer film [%] | difference in thickness (μm) |
| Example 2 | 100 | 5 | PBAT | 5 | 1,2-diol 6 mol % | 99.2 | 450 | absent | 1907 | −1.1 | 3 |
| Example 3 | 100 | 10 | PBAT | 5 | 1,2-diol 6 mol % | 99.2 | 450 | absent | 1921 | −0.4 | 4 |
| Comparative Example 1 | 100 | 20 | PBAT | 5 | 1,2-diol 6 mol % | 99.2 | 450 | absent | 1628 | −15.6 | 6 |
| Comparative Example 2 | 100 | 50 | PBAT | 5 | 1,2-diol 6 mol % | 99.2 | 450 | absent | 1541 | −20.0 | 5 |
| Comparative Example 3 | 100 | 5 | PBAT | 50 | 1,2-diol 6 mol % | 99.2 | 450 | absent | 2361 | 22.5 | 7 |
| Comparative Example 4 | 100 | 0 | — | 0 | — | — | — | present | 1928 | ±0 | — |

The resin compositions of Examples 1 to 3 can be recycled many times, and the film obtained from the recycled pellets has a small difference from the elastic modulus of the polylactic acid monolayer film and can be recycled without affecting the physical properties of polylactic acid itself. Further, since the recycled film has good fluidity and a film having a high film thickness uniformity was obtained, the film forming property was also excellent. On the other hand, in Comparative Example 4 in which only polylactic acid was used, molding failure occurred and recycling could not be performed even once.

Moreover, in Comparative Examples 1 to 3 in which the content of the acid-modified aliphatic polyester (B) was high or the content of the PVA-based resin (C) was high, recycling was possible many times, but there was a large difference in physical properties from the polylactic acid monolayer film. Further, the film produced from the recycled pellets was inferior in film thickness uniformity.

TABLE 2

| | Polylactic acid (A) | Acid-modified aliphatic polyester (B) | | PVA-based resin (C) | | | | Recyclability | Evaluation of mechanical properties | | Evaluation of fluidity of recycled film |
|---|---|---|---|---|---|---|---|---|---|---|---|
| | (part) | (part) | base resin | (part) | modification | degree of saponification | average polymerization degree | molding failure | elastic modulus [MPa] | difference from PLA monolayer film [%] | difference in thickness (μm) |
| Example 4 | 100 | 5 | PBAT | 5 | 1,2-diol 6 mol % | 88 | 450 | absent | 2020 | 4.8 | 6 |
| Example 5 | 100 | 5 | PBAT | 5 | no modification | 88 | 500 | absent | 1908 | −1.0 | 5 |
| Comparative Example 4 | 100 | 0 | — | 0 | — | — | — | present | 1928 | ±0 | — |

The resin compositions of Examples 4 and 5 were also recyclable many times as in Examples 1 to 3. Further, the film obtained from the recycled pellets had a small difference from the elastic modulus of the polylactic acid monolayer film, and could be recycled without affecting the physical properties of polylactic acid itself. Moreover, the film thickness uniformity was slightly inferior as compared to Examples 1 to 3. The reason is due to the difference in the degree of saponification. When the degree of saponification is low, the number of hydroxyl groups in the structure of the PVA-based resin decreases, the compatibility with polylactic acid decreases, and the film thickness uniformity is affected. It is presumed that those in which the PVA-based resins (C) of Comparative Examples 1 to 3 were replaced with a partially saponified PVA-based resin having a saponification degree of 88 mol % or the like may afford results inferior to the results of evaluation of mechanical properties and fluidity in Comparative Examples 1 to 3.

Although the present invention has been described in detail with reference to specific embodiments, it will be apparent to those skilled in the art that various changes and modifications can be made without departing from the spirit and scope of the present invention. The present application is based on Japanese Patent Application No. 2018-183126 filed on Sep. 28, 2018, the contents of which are incorporated herein by reference.

INDUSTRIAL APPLICABILITY

Since the resin compositions of the present invention are all biodegradable resins, the environmental load is small. Moreover, since the difference in mechanical properties from the polylactic acid monolayer film is small at the time of recycling of polylactic acid, it is also useful as recycling of polylactic acid.

The invention claimed is:

1. A resin composition comprising:

a polylactic acid (A), an acid-modified aliphatic polyester-based resin (B) and a polyvinyl alcohol-based resin (C), wherein a content of the acid-modified aliphatic polyester-based resin (B) is 0.3 to 15 parts by weight with respect to 100 parts by weight of the polylactic acid (A), and a content of the polyvinyl alcohol-based resin (C) is 0.3 to 10 parts by weight with respect to 100 parts by weight of the polylactic acid (A), and wherein a degree of saponification of the polyvinyl alcohol-based resin (C) is 70 to 100 mol %, wherein the acid-modified aliphatic polyester-based resin (B) comprises one or more structural units of the following general formulas (1) to (3):

(1)

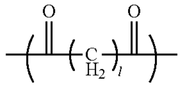

where l is an integer of 2 to 6;

(2)

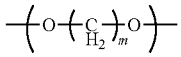

where m is an integer of 2 to 6; and (3)

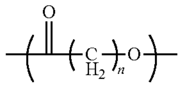

where n is an integer of 2 to 6, and wherein a content ratio, L/D, of an L-lactic acid component and a D-lactic acid component in the polylactic acid (A) is 99/1 or more, wherein a percent difference in an elastic modulus of a film prepared after pelletizing three times of the resin composition, compared to a comparison resin composition prepared from polylactic acid (A) alone is from −1.1% to 4.8%, wherein:

the pelletizing is performed on a 40 mm single screw extruder employing a full flight screw design, a CR value of 3.4, a strand die of 3.5 mm φ×3 holes, a screw rotation speed of 40 rpm, a screen mesh of 90/90 mesh, and processing temperatures C1/C2/C3/C4/H/D of 170/190/210/210/210/210° C., to form a pelletized material, the film is prepared by charging the pelletized material into a 40 mm single screw extruder employing a full flight screw design, a CR value of 3.4, a screen mesh of 90/90 mesh, a film-forming hanger-coat T die of width 450 mm; and processing temperatures C1/C2/C3/C4/H/AD/Die of 170/190/210/210/210/210/210° C., at a rotation speed of 40 rpm, a pick-up roll speed of 3 m/min, and a cooling temperature of 60° C., to form a film of thickness of 100 μm; and the elastic modulus is determined on an AGS-X apparatus, on a test piece of the film 15 mm in width and 100 m in thickness, at a tensile speed of 50 mm/min, in a testing atmosphere at 23° C. and 50% RH, and the percent difference in elastic modulus is given by:

(Elastic modulus of the film of the resin composition/Elastic modulus of the film of the comparison resin composition×100)−100(%).

2. The resin composition according to claim 1, wherein the acid-modified aliphatic polyester-based resin (B) is an aliphatic polyester-based resin modified with α,β-unsaturated carboxylic acids.

3. The resin composition according to claim 1, wherein the polylactic acid (A) is a polylactic acid (A1) that is not acid-modified.

4. A molded article containing the resin composition according to claim 1.

5. A method for producing the resin composition according to claim 1, comprising:

pulverizing and melting a laminate containing a polylactic acid (A) layer, an acid-modified aliphatic polyester-based resin (B) layer, and a polyvinyl alcohol-based resin (C) layer.

6. The resin composition according to claim 1, wherein a total amount of the structural units represented by the general formulae (1) to (3) in the acid-modified aliphatic polyester-based resin (B) is 50 mol % or more.

7. The resin composition according to claim 1, wherein an acid value of the acid-modified aliphatic polyester-based resin (B) is 2.0 to 6.5 mg·KOH/g.

8. The resin composition according to claim 1, wherein the degree of saponification of the polyvinyl alcohol-based resin (C) is 90 to 99.9 mol %.

9. A resin composition comprising:

a polylactic acid (A), an acid-modified polyester-based resin (B) and a polyvinyl alcohol-based resin (C), wherein a content of the acid-modified polyester-based resin (B) is 0.3 to 15 parts by weight with respect to 100 parts by weight of the polylactic acid (A), and a content of the polyvinyl alcohol-based resin (C) is 0.3 to 10 parts by weight with respect to 100 parts by weight of the polylactic acid (A), and wherein a degree of saponification of the polyvinyl alcohol-based resin (C) is 70 to 100 mol %, wherein the acid-modified polyester-based resin (B) comprises one or more structural units of the following general formulas (1) to (3):

(1)

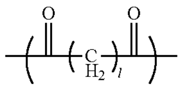

where l is an integer of 2 to 6;

(2)

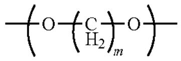

where m is an integer of 2 to 6; and (3)

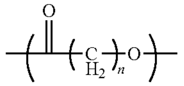

where n is an integer of 2 to 6, wherein the acid-modified polyester-based resin (B) further comprises a structural unit derived from an aromatic dicarboxylic acid, and is an acid-modified polyester-based resin obtained by graft-polymerizing an α,β-unsaturated dicarboxylic acid or an anhydride thereof with an aliphatic polyester-based resin containing, as a main component, a polycondensation product of a compound comprising the one or more structural units of the above general formulas (1) to (3) and the aromatic dicarboxylic acid, wherein a content ratio, L/D, of an L-lactic acid component and a D-lactic acid component in the polylactic acid (A) is 99/1 or more, wherein a percent difference in an elastic modulus of a film prepared after pelletizing three times of the resin composition, compared to a comparison resin composition prepared from polylactic acid (A) alone is from −1.1% to 4.8%, wherein:

the pelletizing is performed on a 40 mm single screw extruder employing a full flight screw design, a CR value of 3.4, a strand die of 3.5 mm φ×3 holes, a screw rotation speed of 40 rpm, a screen mesh of 90/90 mesh, and processing temperatures C1/C2/C3/C4/H/D of 170/190/210/210/210/210° C., to form a pelletized material, the film is prepared by charging the pelletized material into a 40 mm single screw extruder employing a full flight screw design, a CR value of 3.4, a screen mesh of 90/90 mesh, a film-forming hanger-coat T die of width 450 mm; and processing temperatures C1/C2/C3/C4/H/AD/Die of 170/190/210/210/210/210/210° C., at a rotation speed of 40 rpm, a pick-up roll speed of 3 m/min, and a cooling temperature of 60° C., to form a film of thickness of 100 μm; and the elastic modulus is determined on an AGS-X apparatus, on a test piece of the film 15 mm in width and 100 m in thickness, at a tensile speed of 50 mm/min, in a testing atmosphere at 23° C. and 50% RH, and the percent difference in elastic modulus is given by:

(Elastic modulus of the film of the resin composition/Elastic modulus of the film of the comparison resin composition×100)−100(%).

10. The resin composition according to claim 9, wherein the degree of saponification of the polyvinyl alcohol-based resin (C) is 90 to 99.9 mol%.

11. The resin composition according to claim 1, wherein a weight average molecular weight of the acid-modified aliphatic polyester-based resin (B) is 5000 to 50000.

12. The resin composition according to claim 1, wherein an average polymerization degree of the polyvinyl alcohol-based resin (C) is 200 to 1800.

13. The resin composition according to claim 1, wherein the polyvinyl alcohol-based resin (C) has a 1,2-diol structural unit 1 to 20 mol %.

14. The resin composition according to claim 9, wherein a weight average molecular weight of the acid-modified polyester-based resin is 5000 to 50000.

15. The resin composition according to claim 9, wherein an average polymerization degree of the polyvinyl alcohol-based resin (C) is 200 to 1800.

16. The resin composition according to claim 9, wherein the polyvinyl alcohol-based resin (C) has a 1,2-diol structural unit in an amount of 1 to 20 mol %.

* * * * *